(12) United States Patent
Blair et al.

(10) Patent No.: US 7,003,192 B2
(45) Date of Patent: Feb. 21, 2006

(54) MICRO OPTO ELECTRO MECHANICAL DEVICE

(75) Inventors: Paul Blair, Edinburgh (GB); Jean Podlecki, Edinburgh (GB); Mark Lawrence Begbie, Edinburgh (GB); Geradus Johannes Burger, Hengelo (NL)

(73) Assignee: Avanex Corporation, Fremont, CA (US)

( * ) Notice: Subject to any disclaimer, the term of this patent is extended or adjusted under 35 U.S.C. 154(b) by 189 days.

(21) Appl. No.: 10/305,158

(22) Filed: Nov. 27, 2002

(65) Prior Publication Data

US 2003/0161576 A1   Aug. 28, 2003

(30) Foreign Application Priority Data

Feb. 13, 2002   (GB) .................................... 0203343

(51) Int. Cl.
  *G02B 6/26* (2006.01)
  *G02B 6/42* (2006.01)
(52) U.S. Cl. .......................................... 385/18; 385/17
(58) Field of Classification Search ................. 385/16, 385/17, 18, 19, 140; 359/237, 290, 291
See application file for complete search history.

(56) References Cited

U.S. PATENT DOCUMENTS

| | | | |
|---|---|---|---|
| 5,995,688 A | 11/1999 | Aksyuk et al. | |
| 6,007,208 A | 12/1999 | Dickensheets et al. | |
| 6,031,946 A | 2/2000 | Bergmann et al. | |
| 6,106,735 A * | 8/2000 | Kurle et al. | 216/2 |
| 6,195,047 B1 | 2/2001 | Richards | |
| 6,195,478 B1 * | 2/2001 | Fouquet | 385/17 |
| 6,275,320 B1 * | 8/2001 | Dhuler et al. | 359/237 |
| 6,315,462 B1 | 11/2001 | Anthamatten et al. | |
| 6,188,814 B1 | 12/2001 | Bhalla | |
| 6,445,841 B1 * | 9/2002 | Gloeckner et al. | 385/17 |
| 6,483,160 B1 * | 11/2002 | Engelhardt et al. | 257/415 |
| 6,493,482 B1 * | 12/2002 | Al-hemyari et al. | 385/19 |
| 2002/0181838 A1 * | 12/2002 | Cunningham et al. | 385/16 |
| 2003/0021551 A1 * | 1/2003 | Carpenter et al. | 385/89 |

FOREIGN PATENT DOCUMENTS

| | | |
|---|---|---|
| EP | 0762169 A2 | 3/1997 |
| EP | 0 872 748 | 10/1998 |

(Continued)

OTHER PUBLICATIONS

E. H. Pedersen et al., "Flip-Chip Hermetic Packaging for MEMS", EUROSENSORS XIV, 14$^{th}$ European Conference on Solid-State Transmissions, Aug. 27-30, 2000, Copenhagen, Denmark.

(Continued)

*Primary Examiner*—Brian Healy
*Assistant Examiner*—Mary El-Shammaa
(74) *Attorney, Agent, or Firm*—Patterson & Sheridan, LLP (57) ABSTRACT

A hybrid optical component is described incorporating a planar lightguide circuit (PLC) chip 2 having at least two waveguides provided thereon which are separated by a trench, and a MEMS chip 3 attached to the PLC chip and incorporating a MEMS element displaceable relative to the trench so as to control the passage of an optical signal between the two waveguides. A cap 4 is sealingly engaged with the PLC chip 2 to form a housing therewith which houses said MEMS chip 3 hermetically therein. The component may act as a variable optical attenuator (VOA) device in which a MEMS shutter attenuates an optical signal passing between two waveguides, or may be an optical switch in which a MEMS mirror is used to switch an optical signal from a first waveguide between at least two other waveguides which intersect with the first waveguide at the trench.

22 Claims, 5 Drawing Sheets

FOREIGN PATENT DOCUMENTS

| | | |
|---|---|---|
| EP | 0 961 150 | 12/1999 |
| EP | 1093162 A1 | 4/2001 |
| EP | 1 136 851 | 9/2001 |
| EP | 1191373 A1 | 3/2002 |
| WO | WO 9812589 | 3/1998 |
| WO | WO 00/73842 | 12/2000 |
| WO | WO 0106285 A2 | 1/2001 |
| WO | WO 01/38925 | 5/2001 |
| WO | WO 0148532 A2 | 7/2001 |
| WO | WO 0180593 A2 | 10/2001 |

OTHER PUBLICATIONS

Hiroshi Toshiyoshi and Hiroyuki Fujita, "Electrostatic Micro Torsion Mirrors For An Optical Switch Matrix," Journal of Microelectromechanical systems, vol. 5, No. 4, Dec. 1996, pp. 231-237.

EP Search Report, Application No. EP 03 00 2888, dated Jun. 11, 2004.

* cited by examiner

MICRO OPTO ELECTRO MECHANICAL DEVICE

TECHNICAL FIELD

The present invention relates to Micro Electro Mechanical Systems (MEMS) devices for use in optical systems, especially optical systems for telecommunications. In particular, but not exclusively, the invention relates to MEMS devices for use as variable optical attenuators or optical switches.

BACKGROUND OF THE INVENTION

There is a requirement in the telecommunications industry for optical components which function as switches or attenuators for optical networks. Recently, there has been a great deal of interest in optical switches and attenuators based on MicroElectroMechanical Systems (MEMS). WO 98/12589 describes one such switch which is fabricated from a single substrate. Deep Reactive Ion etching (DRIE) is used to form an actuator and a vertical shutter which can be moved by the actuator into or out of a switching region between the ends of one or more optical fibres held in trenches etched in the substrate, so as to switch an optical signal from one optical fibre to the other by reflection off the shutter. The switching region is filled with index-matching fluid to avoid undesirably high losses due to mismatch of refractive indexes in the switching region. The whole switch therefore needs to be sealed from the environment, in order to contain the index-matching fluid within the switch. A disadvantage of this type of device is that there is the possibility of leakage from the package. Moreover, the packaging of such a fluid-filled package is a very complex operation. Also, the long term stability and thus performance of such index-matching fluids is not fully known.

In order to allow greater potential for integration of active and passive optical components, there is however a desire to move away from fibre-based components, to components made using planar waveguide technology. U.S. Pat. No. 6,195,478B describes an optical switch based on planar waveguide technology. In this switch a shutter formed using MEMS technology can be displaced (by a MEMS actuator) along a trench formed between at least two waveguide ends, to effect switching of an optical signal from one waveguide to another by reflection off the shutter. In one embodiment the trench is filled with index-matching fluid, and so again the whole switch needs to be enclosed in an outer package to contain this fluid therein. In other embodiments, the trenches are filled only with air, but even in these latter embodiments it is necessary to seal the whole switching component hermetically from the surrounding environment, in order to protect the delicate structure of the MEMS components from damage from moisture, small particles or other environmental contaminants. This present significant problems, for example this requires the outer package for the device to be made from specific materials known to provide hermetic sealing, and for complex package sealing operations to be performed by skilled operators in order to meet industry hermetic package requirements. Additionally there is the problem that such a hermetic package restricts the type of materials which can be used inside the package: because nothing can pass into the package or out of the package, therefore nothing can be contained inside the package that would cause harm.

Moreover, in order to seal the contents of the package from the external environment this requires all signal entrance and exit ports (normally in the form of input and output fibres passing through walls of the package) of the packaged end component to be sealed as well and this can be technically challenging, particularly (but not exclusively) where hermetic sealing is required, and hence costly and time-consuming for components having a high port count. Also, this requirement tends to increase the risk of component failure (if any of these port seals fail). Moreover, such port sealing can place undesirable stress on the input/output fibres and so some stress release mechanism may have to be built into the package to avoid this problem. These factors all contribute to undesirable expense and complexity in the manufacture of the end product.

It is an aim of the present invention to avoid or minimise one or more of the foregoing disadvantages.

SUMMARY OF THE INVENTION

According to a first aspect of the present invention there is provided an optical component comprising:

a first substrate having at least first and second planar waveguides provided thereon which extend along the substrate to a trench;

and a second substrate attached to the first substrate and incorporating MEMS switching means including a switching element which is displaceable between at least first and second positions relative to the trench, the waveguides being positioned such that there is an optical path from the first waveguide to the second waveguide when the switching element is in at least said first position relative to the trench; and wherein the optical component further includes cap means sealingly engaged with the first substrate and forming a housing therewith which houses said second substrate therein.

An advantage of the above-described component is that there is no need for the whole component, namely the planar waveguide component and the MEMS substrate to be sealed from the surrounding environment, for example hermetically sealed in a hermetic package, in order to hermetically enclose the MEMS devices. Only the MEMS substrate need be hermetically enclosed. Thus, the whole component can be housed in a simpler package which is not necessarily sealed to the external environment. Thus, there is no need to seal around the input and output ports of the packaged end component. This reduces considerable expense in materials and fabrication costs for the component manufacturer.

Preferably, the cap means is made of a hermetic material and is most preferably hermetically sealed to the first substrate. The cap means may conveniently comprise a piece of glass, ceramic or silicon which has a recess machined therein to encapsulate the second substrate (i.e. the MEMS substrate). Metal materials such as, for example, Kovar, could alternatively be used in which case the shape of the cap may be pressed out from a sheet of the metal material.

The cap means is preferably soldered to the first substrate. Alternatively, the cap means may be bonded to the first substrate by means of epoxy or other adhesive or bonding materials such as, for example, glass frit (although these bonding approaches may not provide a hermetic seal). The cap means may be designed to cover substantially all, or only a portion, of the area of an upper surface of the first substrate.

The second substrate may conveniently be attached to the first substrate by flip-chip bonding. The MEMS switching element may be displaceable along the trench, in the plane of the PLC chip. In this case the second substrate is preferably disposed at least partially within a well provided therefor in the first substrate, in which case the second substrate may conveniently be flip-chip bonded to a lower surface of the well. Alternatively, the MEMS switching element may be displaceable in a direction substantially perpendicular to the first substrate. In this case the second substrate may simply be flip-chip bonded to an upper surface of the first substrate.

In one embodiment, the first and second waveguides are substantially coaxial and are arranged generally end-to-end on opposite sides of the trench, and the switching element comprises a displaceable shutter formed and arranged for varying the attenuation of an optical signal passing from the first waveguide to the second waveguide. The shutter may be displaceable between a first position in which the shutter does not interact with an optical signal passing from the first waveguide to the second waveguide, and at least one further position in which the shutter intercepts light incident thereon so as to introduce a desired attenuation to the optical signal passing from the first waveguide to the second waveguide. The shutter may, if desired, be at least partially coated with a reflective material to improve attenuation of the optical signal. This also tends to reduce polarization dependent loss (PDL) due to transmission of incident signal light through the shutter. If the shutter is not coated with a reflective material then the surface quality of the reflecting surface of the shutter, namely the flatness of that surface, becomes a limiting factor on component performance: any surface irregularities may adversely affect the operation of the component.

Alternatively, the optical component may be designed for use as an optical switch. In this case, the switching element may conveniently comprise a reflective element which thus acts as a mirror and which is displaceable between at least a first position in which an optical path exists between the first and second waveguides, whereby they are optically coupled, and a second position in which the first and second waveguides are substantially optically isolated, and the optical component preferably further includes at least a third planar waveguide extending along the substrate to the trench and positioned such that the first and third waveguides are optically coupled when the reflective element is in said second position.

In any of the above-described embodiments, the MEMS switching means incorporated on the second substrate of the optical component may include multiple MEMS switching elements, such as shutters and/or mirrors, for attenuating and/or switching optical signals in respective trenches formed at intersections between respective pluralities of waveguides provided on the first substrate.

In addition to the second substrate (which we will refer to as the "MEMS chip"), the optical component may include further MEMS chips which are each flip-chip bonded to the first substrate. In this case, the cap means may comprise one single cap covering all the MEMS chips, or alternatively may comprise a plurality of caps each covering one or more of the MEMS chips. For example, the optical component may be of the matrix switch type comprising a first plurality of parallel waveguides and a second plurality of parallel waveguides which intersect with the first plurality of waveguides at a multiplicity of cross-points, and at each cross-point a trench is provided via which a movable MEMS mirror may interact with an optical signal in the trench in order to switch the signal from one waveguide to another, as desired.

According to a third aspect of the invention there is provided a method of forming an optical component comprising:

providing a first substrate having at least first and second planar waveguides provided thereon extending to a trench;

providing a second substrate incorporating MEMS switching means;

providing cap means for enclosing the second substrate between the cap means and the first substrate;

attaching the second substrate to the first substrate in such a manner that a switching element of the MEMS switching means is displaceable between at least first and second positions relative to the trench, the waveguides being positioned such that there is an optical path from the first waveguide to the second waveguide when the switching element is in at least said first position relative to the trench;

and bonding the cap means to the first substrate so as to seal the second substrate within a chamber formed by the cap means and the first substrate.

Preferably, the cap means is hermetically sealed to the first substrate. In this case, the method preferably includes the further steps of:

providing a first ring of metal material on an upper surface of the first substrate, encircling a region to contain the second substrate;

assembling the cap means on the first substrate so as to substantially align a lower surface of the cap means with the first ring; and bonding the cap means to the first ring, so as to seal the second substrate within a chamber formed by the cap means and the first substrate.

The step of bonding the cap to the first ring of metal may conveniently comprise the following steps:
(1) disposing a complementary ring of solder material on a bonding surface of at least one of the cap means and the first ring of metal material;
(2) with the cap means assembled on the first substrate, heating the assembly so as to melt the solder.

Pressure is preferably applied to the cap during step (2), to assist the bonding operation. In another possible embodiment, a second ring of metal material may be provided on a lower surface of the cap if desired. The solder material may be then deposited on the first and/or second ring of metal material as a solder perform or by, for example, evaporation or electro-plating.

Alternatively, the step of bonding the cap means to the first ring of metal may include providing a second ring of metal material on a lower surface of the cap, assembling the cap means on top of the first substrate so that the second ring of metal on the cap is substantially aligned with the first ring of metal on the first substrate, and then laser welding the two rings of metal together.

Alternatively, the cap means may simply be bonded to the first substrate using epoxy or other suitable adhesive or bonding material such as, for example, a glass frit material. (In this case there will generally be no need to provide any metal ring on either the cap means or the first substrate.) Whether or not such a bond will be hermetic will be determined by the epoxy or other adhesive or bonding material chosen, and the long-term hermeticity of known epoxies and adhesives is not yet fully known. The above-described soldering technique is therefore the most preferred approach for achieving a truly hermetic bond between the cap and the first substrate.

For the avoidance of doubt, the above-mentioned rings on the cap means and/or first substrate need not be of circular or substantially circular shape. They may, for example, be of rectangular or substantially rectangular shape, or any other desired shape. Furthermore it will be understood from the above that the terms "switching means" and "switching element" as used herein are not intended to limit the scope of the invention only to optical components functioning as switches which fully attenuate or re-direct an optical signal, but are intended to also cover variable optical attenuator (VOA) devices and any other devices in which a moving element interacts with an optical signal in any way and for any purpose.

According to another aspect of the invention there is provided an optical component comprising:

a first substrate having at least first and second planar waveguides provided thereon which extend along the substrate to a trench;

and a second substrate attached to the first substrate and incorporating MEMS switching means including a switching element which is displaceable between at least first and second positions relative to the trench, the waveguides being positioned such that there is an optical path from the first waveguide to the second waveguide when the switching element is in at least said first position relative to the trench; and wherein the second substrate is disposed at least partially within a well provided therefor in the first substrate. The second substrate may conveniently be flip-chip bonded to a lower surface of the well.

BRIEF DESCRIPTION OF THE DRAWINGS

Preferred embodiments of the invention will now be described by way of example only and with reference to the accompanying drawings in which.

DETAILED DESCRIPTION

The invention concerns a locally hermetically sealed SOI MEMS device bonded to a PLC substrate such that the MEMS device is able to interact optically with the optical field in the PLC. The device does not require package level hermetic sealing from the environment. The invention also concerns the processing route towards this sealed hybrid device. The claimed invention is not specific to the final functionality of the device, that is the device created could be a VOA, a switch, or some other device where controlled optical interaction between a MEMS device, a waveguide and an optical beam is required. While the specifics of the waveguide pattern and MEMS device details may change to accommodate the different functions, the process flow for fabricating the packaged component will remain substantially unchanged. A VOA device in accordance with one embodiment of the invention will now be described. The extension to a switch application is described as a second embodiment thereafter.

As will be readily understood in the art, the term "hermetic" is used to refer to devices, materials or structures which form an air-tight seal, usually with an associated maximum allowable leak rate and/or internal moisture content e.g. Telcordia GR-1221 standards define a maximum internal moisture content of 5000 parts per million water vapour (for a hermetic package). Usually, a hermetic seal is formed at an interface between glass and/or metallic surfaces, but there are also other materials potentially capable of providing a hermetic seal such as silicon or ceramic materials.

Figure 1:
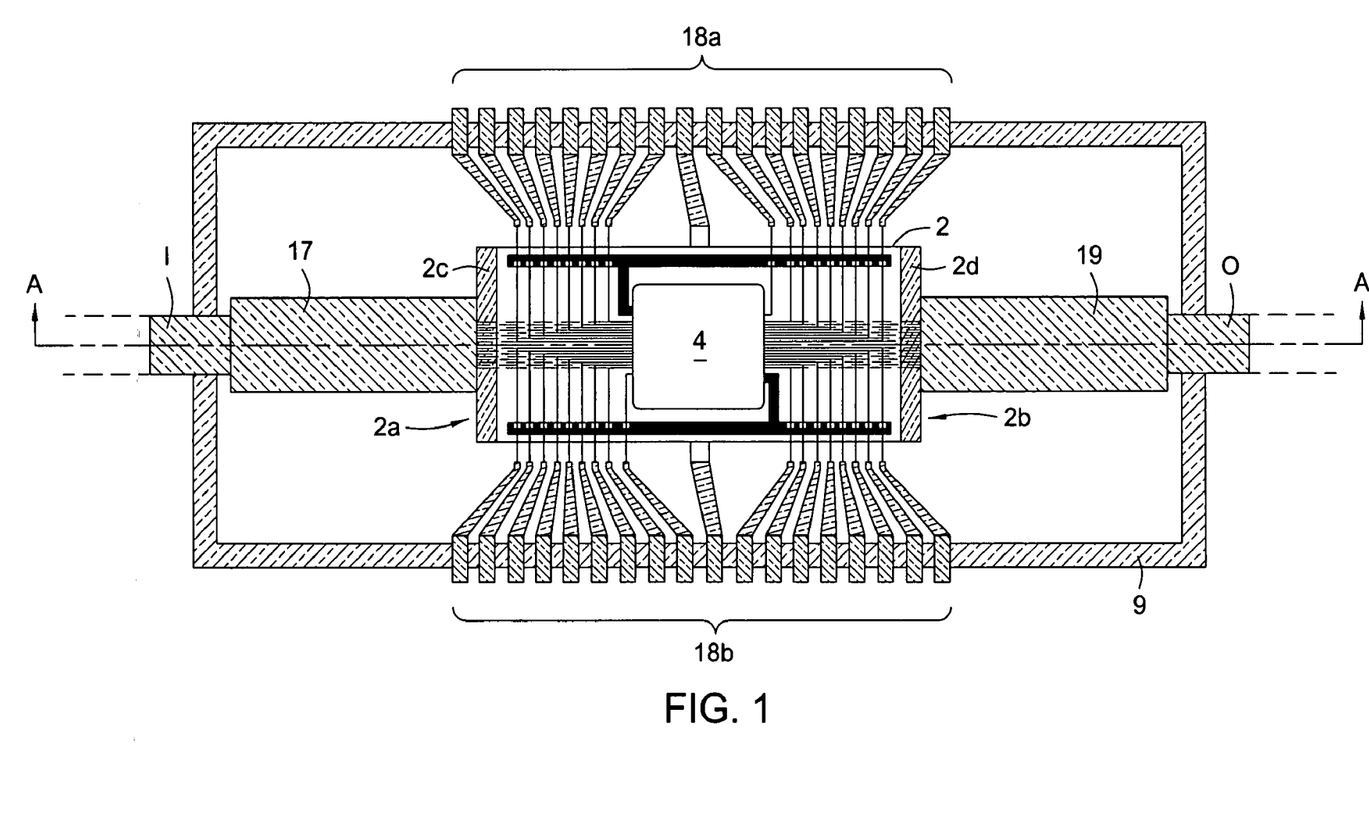
FIG. 1 is a plan view of a packaged optical component according to an embodiment of the invention, in which a lid of the package has been removed to reveal the contents of the package.
Figure 2:
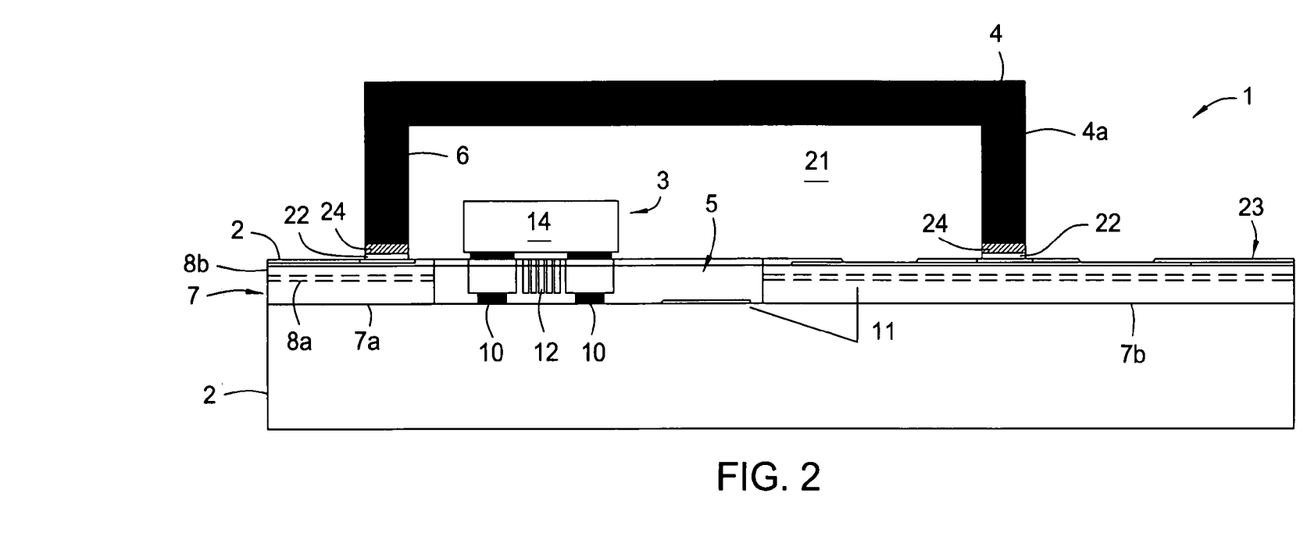
FIG. 2 is a cross-sectional side view, taken along the line A–A' of FIG. 1, of a portion of the optical component of FIG. 1 comprising a PLC chip with a MEMS chip flip-chip bonded thereto.

FIGS. 1 and 2 show an optical component comprising a VOA device 1, according to one embodiment of the invention. The device comprises a first substrate 2 having a planar lightguide circuit (PLC) formed thereon (hereinafter referred to as the "PLC chip"), and a second substrate 3 having a MEMS device formed thereon (hereinafter referred to as the "MEMS chip") and which is flip-chip bonded to the PLC chip. The MEMS chip 3 sits in a well 5 provided therefor in the PLC chip 2. A hermetic cap 4 is sealed to the PLC chip so as to house the MEMS chip 3 between the PLC chip 2 and the cap 4. The whole device so assembled is housed within a (non-hermetic) housing 9. A fibre V-groove array (FVA) device 17,19 connects an input fibre I and an output fibre O to input and output edges 2a, 2b respectively of the PLC chip. Two glass rails 2c, 2d (not shown in FIG. 2) are attached to an upper surface of the PLC chip 2, adjacent to the chip's input and output edges 2a, 2b respectively and arranged parallel to these edges, to increase the bonding area available to bond the FVAs to the chip. This bonding area is sometimes referred to as the "bond line". (In other possible embodiments other ways of connecting the input/output fibres to the PLC chip may be used.) Electrical connections 18a, 18b are provided for carrying operating electrical signals to and from the device inside the package.

Figure 3:
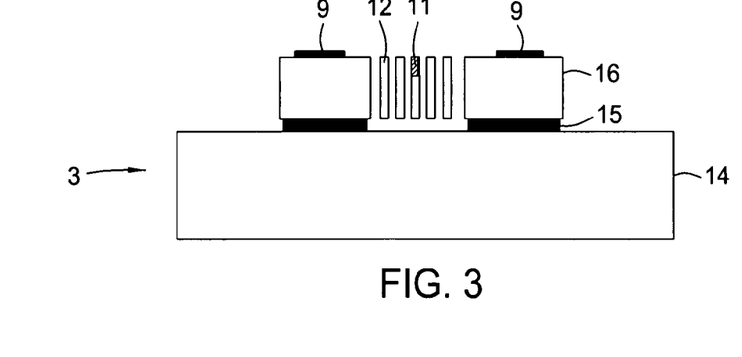
FIG. 3 is a cross-sectional side view of a MEMS chip forming a portion of the optical component of FIG. 1, taken along the line A–A' in FIG. 1.

FIG. 3 shows the MEMS chip 3 prior to bonding to the PLC chip 2. The MEMS device is fabricated using known MEMS processing techniques. The starting point is an SOI wafer comprising a silicon substrate 14, a sacrificial layer of silicon oxide 15 on top of the silicon substrate, and a further silicon layer 16 on top of this oxide layer. The SOI wafer is processed using known micromachining technology, through various process stages for: creating metal bond pads 9 (on top of the upper silicon layer 16) for flip-chip bonding the MEMS chip to the PLC chip; creating an actuator 12 in the upper silicon layer 16; creating a shutter 11 in the upper silicon layer 16 which shutter is displaceable by the actuator, for attenuating (or not attenuating) an optical signal; a shadow masking stage in which the shutter is coated with a reflective material; and releasing the moving parts of the MEMS device, namely the shutter and the moving actuator parts, from the silicon substrate 14. The MEMS chip 3 having the MEMS device so formed therein is then separated from the rest of the SOI wafer in which it is formed, for example by cleaving. In this embodiment the actuator and the shutter are formed in the SOI wafer using DRIE etching, whereby the shutter is formed vertically in the depth of the (upper silicon layer 16 of the) wafer, perpendicular to the plane of the wafer, similarly to the displaceable switching element formed in WO98/12589. The shutter can be designed to be displaceable gradually (i.e. incrementally), or alternatively displaceable between a plurality of predetermined positions only, in order to vary the degree of attenuation of an optical signal (e.g. between zero attenuation or full attenuation).

Figure 4:
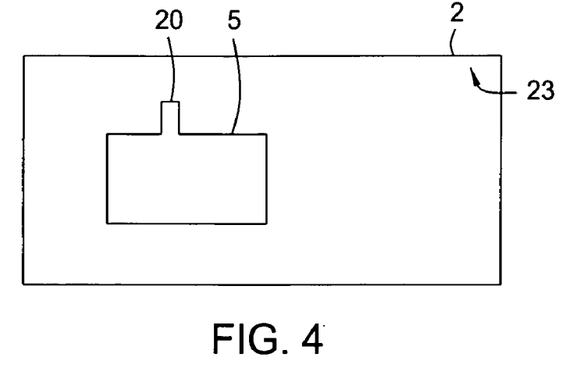
FIG. 4 is a schematic plan view of a PLC chip having a well and slot etched therein.
Figure 5:
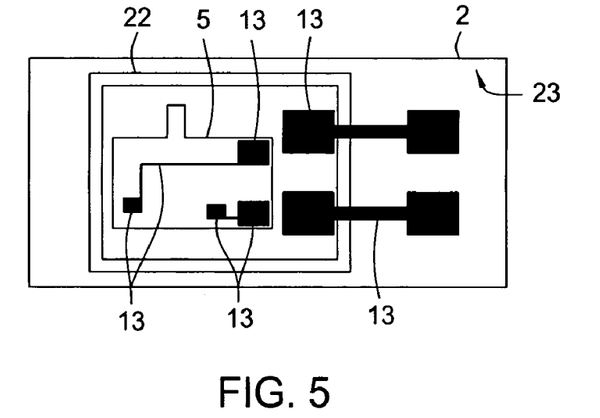
FIG. 5 is a schematic plan view of the PLC chip of FIG. 4, onto which metal tracking and contacts have been deposited.
Figure 6:
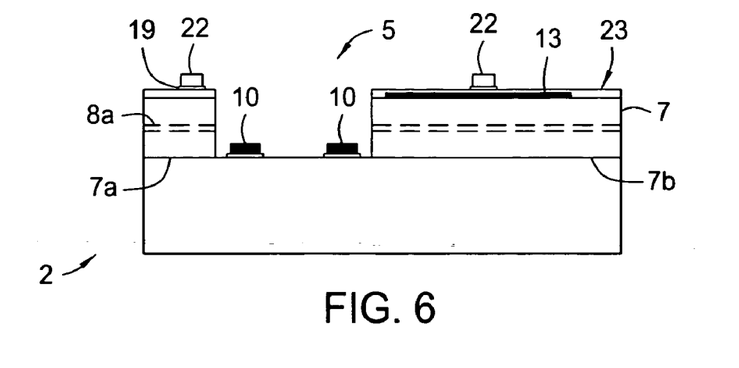
FIG. 6 is a cross-sectional side view of a PLC chip forming a portion of the optical component of FIG. 1, taken along the line A–A' in FIG. 1.

The starting point for the PLC chip 2 is a silica-on-silicon substrate in which planar waveguides forming a desired waveguide circuit have already been formed. The PLC includes at least one waveguide 7 defining an optical path via which a signal to be attenuated will pass, in operation of the component. The planar silica waveguides in the present embodiment are formed on a silicon wafer using Flame Hydrolysis Deposition technology, together with photolithographic masking and etching, but in other embodiments other known techniques for forming planar waveguides could be used e.g. Chemical Vapour Deposition(CVD), plus masking and etching. The waveguides are of the "buried waveguide" type, each comprising a waveguide core 8a covered by cladding 8b. The further processing of the PLC chip, before it is ready for attachment to the MEMS chip, is now summarized, with reference to FIGS. 4 to 6:

1. Perform a (photoresist) masking and etching process so as to etch a well 5 in the silica layer of the waveguide chip (into which well the MEMS chip will eventually be positioned) and also a slot or trench 20 through the depth of the signal waveguide core and cladding. The slot is an extension of the well 5, as illustrated in FIG. 4. The slot effectively divides the original waveguide 7 into two separate waveguides 7a, 7b having a common optical axis. Although not indicated in FIGS. 4 and 5, in practice the slot extends generally at an angle to the optical axis of the signal waveguide (in order to avoid or minimise back reflection effects at the waveguide/trench interface).
2. Deposit Au/Cr metal tracking and contacts 13 on the upper surface of the PLC and/or the lower surface of the well, for carrying electronic signals to and from the MEMS chip which is later to be positioned in the well.
3. Deposit a seed layer 19 of Au/Cr onto which a ring 22 of gold (Au) is then deposited. (See FIG. 5) This is the ring onto which the hermetic cap will later be fitted.
4. Deposit AuSn solder pads 10 onto metal contacts 13 or tracking at the bottom of the well in the PLC chip (see FIG. 6), onto which solder pads the MEMS chip will be flip-chip bonded.

The PLC chip is now ready for the MEMS chip 3 to be flip-chip bonded thereto. In this embodiment several PLC chips 2 are formed in a single wafer-and are first diced up into individual PLC chips before a MEMS chip 3 is bonded to each PLC chip 2. In alternative possible embodiments individual MEMS chips could be bonded to respective (undiced) PLC chips on the PLC wafer and the bonded assemblies could then be diced individually from the wafer, or a MEMS wafer incorporating several (undiced) MEMS chips could even be assembled directly onto the waveguide wafer so as to bond the MEMS chips to respective PLC chips, and the assembled devices than diced out from the wafers (this latter embodiment may though be impractical due to problems presented by such a dicing process).

The final assembled optical component 1 is shown in FIGS. 1 and 2. As can be seen the MLEMS chip 3 is placed in the well 5 formed in the PLC chip 2 and the optically interacting and actuated part of the MIEMS device (namely the displaceable shutter 11) is designed to be displaceable in the plane of the PLC, within the trench 20 formed in PLC chip, so as to interact with an optical signal field exposed in the trench 20. The bonding of the MEMS chip 3 to the PLC chip 2 is by standard flip-chip bonding techniques, as commonly used in the electronics industry. Flip-chip bonding machines suitable for this process are readily available commercially. FIGS. 1 and 2 also show the local sealing cap 4. This is a piece of glass or Si (or any other appropriate material, namely a material having hermetic characteristics) with a recess 6 machined therein to encapsulate the MEMS substrate 3 which protrudes above an upper surface 23 of the PLC chip 2, as shown in FIG. 2.

In this embodiment the cap is assembled to the rest of the component by soldering. A complementarily shaped ring of solder perform 24 cut from a sheet of solder mix is deposited onto the Au ring 22 on the PLC chip. The process for soldering the cap 4 to the PLC is as follows:

(1) assemble the cap 4 on top of the PLC chip 2, so that the solder preform ring 24 engages with a lower surface of a circumferential wall 4a of the cap 4;

(3) apply pressure to the cap;

(4) heat the whole assembly so as to melt the solder preform.

In a modified process the cap 4 may be provided with a similar Au bonding ring to the PLC chip and the solder perform ring 24 for the cap may be deposited on top of the Au bonding ring on the cap. Steps (3) and (4) are then carried out as above.

In the above-described embodiment the chamber 21 formed between the cap 4 and the PLC chip 2 (which chamber also contains the trench 20) is filled with air. In other embodiments the chamber could potentially be filled with a fluid, such as index-matching fluid as used in the device of WO98/12589, if desired for optical performance reasons, although it is preferable not to use such fluid if possible in order to avoid the risk of fluid leakage inside the package which could adversely affect the performance of the optical component, and moreover using such fluid creates additional packaging complexity.

It will be appreciated that in order to avoid the need for index-matching fluid certain design measures must be taken. In the case where a waveguide is terminated by a region of constant refractive index through which the guided field may propagate freely (i.e. air in the trench 20, in the present case), steps must be taken to prevent the reflected signal at the waveguide/trench interface from coupling and propagating back down the waveguide. Where access is required to the optical signal field (as is the case in MEMS VOA or switch devices) the constant refractive index region is typically filled with a material that minimises back reflections by matching the waveguide material index while still allowing interaction with the field—i.e. an index match fluid is used as mentioned above. However, the encapsulation, retention, environmental dependency of the index and long term stability of such fluids do not make this an attractive option in many cases.

An alternative route is available that does not require the use of index matching fluids. By angling the waveguide/trench interface surface the back reflected field can be prevented from coupling back into the waveguide. This technique is commonly employed in fibre connection devices where eight degree cleaves are created at the fibre ends to minimise back reflections. In that case the fibres are in contact and no free space propagation is expected to occur.

In the case of a MEMS VOA or switch, for example, free space propagation is required. The effect of angling the interface is that due to refraction the signal beam is deviated as predicted by Snell's law. To ensure efficient coupling into the (opposing) waveguide at the exit from the constant refractive index region (i.e. on exit from the trench) the opposing waveguide face must be both angled parallel to the first (angled) interface and also laterally offset to minimise waveguide coupling losses. We use this latter technique so that an air-filled trench can be used (and thus no need for index-matching fluid).

As illustrated clearly in the plan view of the optical component in FIG. 1, the size of the cap relative to the PLC chip is small. In this embodiment the area of the cap 4 covers only a portion of the surface area of the PLC chip 2. In other embodiments the cap 4 could potentially be bigger (or even smaller, if desired). As well as providing localized hermetic sealing of the MEMS chip, the cap also provides protective cover over the areas of the waveguide 7 exposed at the slot 20.

Figure 7:
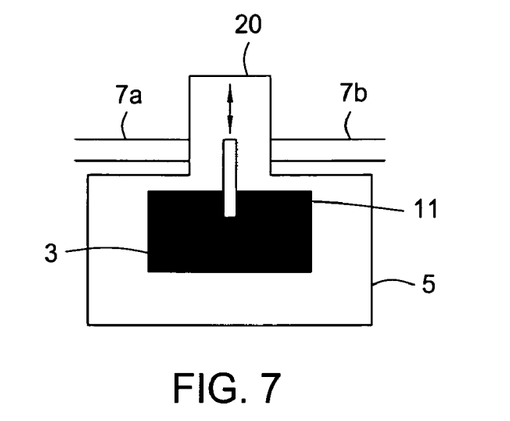
FIG. 7 is a schematic plan view of a variable optical attenuator (VOA)
Figure 8:
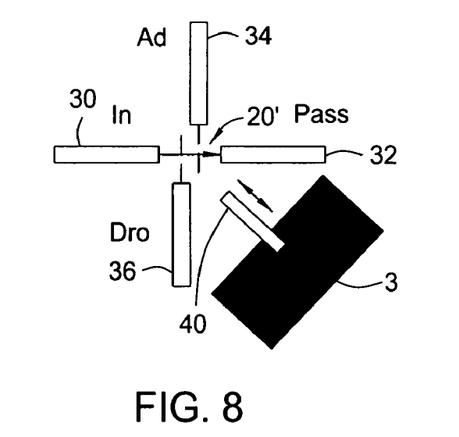
FIG. 8 is a schematic plan view of an optical switch arrangement.
Figure 10:
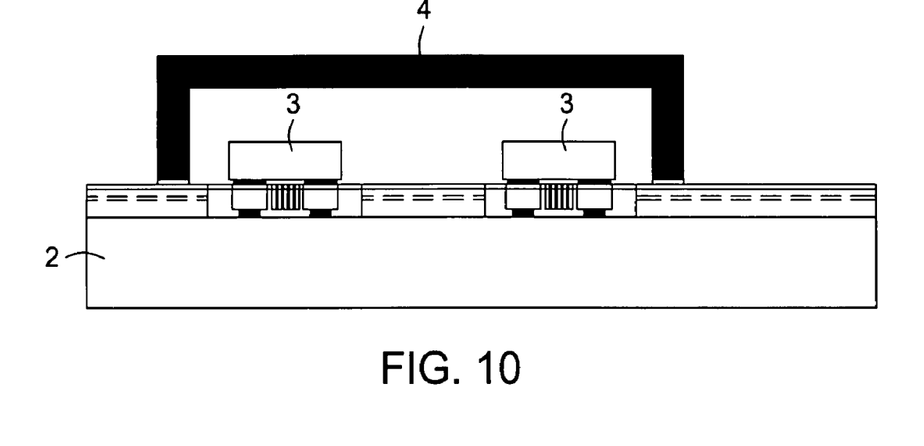
FIG. 10 is a side view illustrating more than one MEMS chip.
Figure 11:
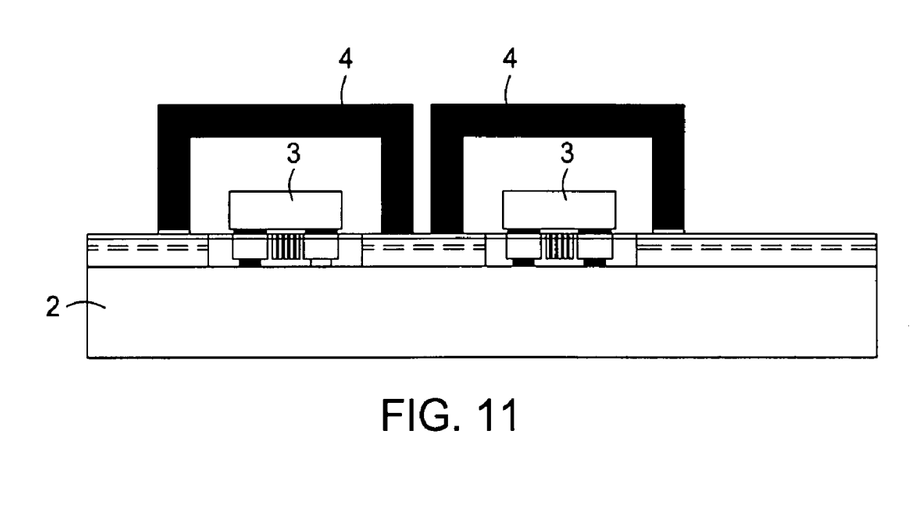
FIG. 11 is a side view illustrating more than one cap.

In the above-described embodiments it will be appreciated that only two bonding processes are required to assemble the main components of the final device i.e. a first flip-chip bonding process to bond the MEMS chip 3 to the PLC chip 2, and a second bonding process to bond the hermetic cap 4 to the PLC chip. By incorporating more than one MEMS moving shutter in the MEMS chip, as shown in FIG. 10, it is possible to create multiple VOA devices, one for each a plurality of waveguides with trenches formed therein (for a respective shutter) which may be provided in the PLC. Thus it is possible to easily create a multi-channel VOA, without requiring any additional bonding steps. Each VOA is assembled simultaneously when the MEMS chip (incorporating multiple shutter devices) is flip-chip bonded to the PLC. A single hermetic cap, as shown in FIG. 10, can be used to encapsulate the MEMS chip, and thus all the MEMS devices formed therein. In another embodiment, a plurality of caps may be used as shown in FIG. 11.

Where the optical component is a switch, rather than a VOA, in terms of the process flow there is no difference between the above-described process for forming a MEMS VOA and the process used for forming a MEMS switch. The waveguide layout on the PLC will however be different. Rather than two generally coaxial waveguides 7a, 7b which are interrupted by a trench 20, as illustrated in FIG. 7, there will be three or four waveguides 30,32,34,36 which intersect at a common trench 20' as shown in FIG. 8. In the preferred four-waveguide embodiment illustrated in FIG. 8 two of the waveguides 30,32 would be coaxial while the two other waveguides 34,36 would be normal to the first two waveguides but are not coaxial—their optical axes would instead be slightly offset as shown. The reason for this is that the effect of the finite thickness of the reflective movable MEMS element requires such a compensating offset in the waveguides. FIGS. 7 and 8 are intended to demonstrate that there is little technical difference between the VOA and the switch embodiments in terms of process technology required. The major difference is one of optical directivity: in the VOA a MEMS shutter 11 must prevent (at least partially) the signal light from entering the second waveguide 7b from the first waveguide 7a, while for the switch the displaceable reflective MEMS element (the mirror) 40 must direct the signal light from the first waveguide 30 towards an appropriate one of the other waveguides.

Additional features may also be desirable for inclusion in a switch such as, for example, bi-stable latching features. As with the multiple VOA device described above, many MEMS switches may be formed on one MEMs chip which is then flip-chip bonded to a PLC, and a single hermetic cap can then be used to encapsulate the MEMS chip, and hence all the MEMs switches formed thereon.

Further modifications and improvements on the above-described embodiments are of course possible within the scope of the invention. For example, although the MEMS devices described above are fabricated by silicon-on-insulator micromachining using DRIE, it will be readily appreciated that other MEMS technologies could equally be used to form suitable MEMS actuator and shutter structures, for example bulk micromachining or using polysilicon layers.

Furthermore, in the above-described embodiment the MEMS shutter is designed to move generally parallel to the plane of the PLC, but in other possible embodiments the shutter 11 (or mirror 40) may instead be displaceable generally perpendicularly to the plane of the PLC. In this case rather than forming a well 5 in the PLC, into which the MEMS chip is disposed, the MEMS chip 3 may instead simply be flip-chip bonded to the upper surface 23 of the PLC so that the shutter 11 may move in and out of the trench 20 so as to intercept or not intercept respectively the optical signal in the trench. It will be appreciated that the recess 6 in the cap 4 may need to be a little deeper in this embodiment, in order to accommodate the MEMS chip therein, as compared with the FIG. 2 embodiment in which the MEMS chip is at least partly recessed in the well 5 provided therefore in the PLC.

Figure 9:
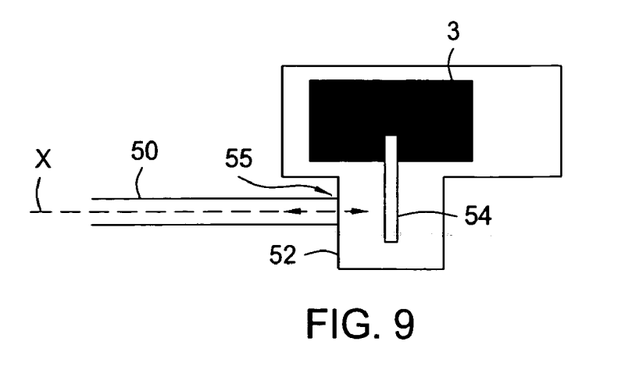
FIG. 9 is a schematic plan view of a variable optical attenuator according to another embodiment of the invention.

In another possible embodiment, the variable optical attenuator may be formed from a single waveguide 50 which terminates at a trench 52 in which a MEMS shutter 54 is displaceable. As shown in FIG. 9, the shutter can be positioned so as to fully reflect an optical signal incident thereon, emergent from the end 55 of the waveguide terminating at the trench, whereby the signal is reflected back down the single waveguide 50. By sliding the shutter element 54 in a direction perpendicular to the optical axis X of the waveguide 50, either gradually or between several predetermined positions, Varying degrees of partial reflection (or even no reflection at all) of the incident optical signal occurs, whereby the incident signal is variably attenuated. The unreflected portion of the signal passes through the trench and is either dissipated in the silica layer of the PLC, or may enter another waveguide (not shown) provided to pick up such unreflected light.

Finally, it will be appreciated that the invention is not only applicable to hybrid VOA and switch components but also to any other hybrid optical components incorporating a MEMS chip attached to a PLC chip.

The claimed invention is:
1. An optical component comprising:
   a first substrate having a well and a trench defined therein, wherein the trench is an extension of the well, and at least first and second planar waveguides provided thereon which extend along the substrate to the trench;
   a MEMS chip disposed in the well and attached to the first substrate, wherein the MEMS chip comprises a wafer that includes a first layer, a second layer and a third layer, and the third layer incorporates an actuator and a switching element, which is displaceable by the actuator between at least first and second positions within the trench, and the waveguides are positioned such that there is an optical path from the first waveguide to the second waveguide when the switching element is in at least said first position within the trench; and a cap means sealingly engaged with the first substrate and forming a housing therewith which houses said MEMS chip therein, wherein a chamber is formed between the cap means and the MEMS chip.

2. An optical component according to claim 1, wherein the cap means is hermetically sealed to the first substrate.

3. An optical component according to claim 1, wherein the cap means is made of a hermetic material.

4. An optical component according to claim 1, wherein the cap means is soldered to the first substrate.

5. An optical component according to claim 1, wherein the MEMS chip is flip-chip bonded to the first substrate.

6. An optical component according to claim 1, wherein the switching element is displaceable along the trench, in the plane of the first substrate.

7. An optical component according to claim 1, wherein the switching element is displaceable in a direction substantially perpendicular to the first substrate.

8. An optical component according to claim 1, wherein the cap means covers only a portion of the area of an upper surface of the first substrate.

9. An optical component according to claim 1, wherein the first and second waveguides are substantially coaxial and are arranged generally end-to-end on opposite sides of the trench and the switching element comprises a displaceable shutter formed and arranged for varying the attenuation of an optical signal passing from the first waveguide to the second waveguide.

10. An optical component according to claim 9, wherein the shutter is displaceable between a first position in which the shutter does not interact with an optical signal passing from the first waveguide to the second waveguide, and at least one further position in which the shutter intercepts light incident thereon so as to introduce a desired attenuation to the optical signal passing from the first waveguide to the second waveguide.

11. An optical component according to claim 1, wherein the switching element comprises a reflective element which is displaceable between at least a first position in which an optical path exists between the first and second waveguides, whereby they are optically coupled, and a second position in which the first and second waveguides are substantially optically isolated, and the optical component further includes at least a third planar waveguide extending along the substrate to the trench and positioned such that the first and third waveguides are optically coupled when the reflective element is in said second position.

12. An optical component according to claim 1, wherein the MEMS chip includes at least one switching element.

13. An optical component according to claim 1, further comprising at least one further MEMS chip disposed in the well and attached to the first substrate, wherein the at least one further MEMS chip comprises a wafer that includes a first layer, a second layer and a third layer, and the third layer incorporates at least one additional actuator and at least one additional switching element, which is displaceable by the at least one additional actuator between at least first and second positions relative to the trench.

14. An optical component according to claim 1, wherein the chamber formed between the cap means and the MEMS chip is filled with air.

15. An optical component according to claim 13, wherein the cap means comprises a single cap covering each said MEMS chip.

16. An optical component according to claim 13, wherein the cap means comprises a plurality of caps, each cap covering at least one said MEMS chip.

17. An optical component according to claim 1, wherein the optical path from the first waveguide to the second waveguide is through air in the trench.

18. An optical component comprising:

a first substrate having a well and a trench defined therein, wherein the trench is an extension of the well, and at least one planar waveguide provided thereon which extends along the substrate to the trench at a first end thereof;

a MEMS chip disposed in the well and attached to the first substrate, wherein the MEMS chip comprises a wafer that includes a first layer, a second layer and a third layer, and the third layer incorporates an actuator and a switching element, which is displaceable by the actuator, between at least first and second positions within the trench, and the waveguide is positioned such that an optical signal propagating from a second end of the waveguide to said first end thereof is reflected back along the waveguide in the opposite direction when the switching element is in at least said first position within the trench; and a cap means hermetically sealingly engaged with a portion of the first substrate and forming a housing therewith which houses said MEMS chip therein, wherein a chamber is formed between the cap means and the MEMS chip.

19. An optical component according to claim 1, further including a package which contains the optical component.

20. An optical component according to claim 18, wherein the chamber formed between the cap means and the MEMS chip is filled with air.

21. An optical component comprising:

a first substrate having a well and a trench defined therein, wherein the trench is an extension of the well, and at least first and second planar waveguides provided thereon which extend along the substrate to the trench; and a MEMS chip disposed in the well and attached to the first substrate, wherein the MEMS chip comprises a wafer that includes a first layer, a second layer and a third layer, and the third layer incorporates an actuator and a switching element, which is displaceable by the actuator between at least first and second positions within the trench, and the waveguides are positioned such that there is an optical path from the first waveguide to the second waveguide when the switching element is in at least said first position within the trench, wherein the MEMS chip is hermetically sealed within a housing on a portion of the first substrate.

22. An optical component according to claim 21, wherein the second substrate is flip-chip bonded to a lower surface of the well.

* * * * *